Sept. 8, 1936.  C. J. KING  2,053,797
FLUID OPERATED REGULATING MACHINE
Filed Nov. 9, 1933  5 Sheets—Sheet 1

Fig.1

INVENTOR:
Cyril J. King,
BY Redding, Greeley, O'Shea and Campbell
HIS ATTORNEYS

Sept. 8, 1936.　　　　　　C. J. KING　　　　　2,053,797
FLUID OPERATED REGULATING MACHINE
Filed Nov. 9, 1933　　　　5 Sheets-Sheet 3

Fig. 3

INVENTOR:
Cyril J. King,
BY
HIS ATTORNEYS

Fig. 9

Patented Sept. 8, 1936

2,053,797

UNITED STATES PATENT OFFICE 2,053,797

FLUID OPERATED REGULATING MACHINE

Cyril J. King, Flushing, N. Y., assignor to General Regulator Corporation, New York, N. Y., a corporation of New York Application November 9, 1933, Serial No. 697,360

22 Claims. (Cl. 50—10)

This invention relates generally to an improved fluid operated regulating machine adaptable in principle for use wherever automatic regulation is to be effected as, for instance, of pressure, speed, volume, liquid level, etc. In the present application the improved principles will be disclosed as embodied in a machine adapted primarily for pressure regulation but it will be apparent to one skilled in the art that such a disclosure is merely by way of example and not limitation, in that machines embodying the same principle or principles may equally well be adapted for other purposes. Accordingly, wherever particular reference is made to problems incident to pressure regulation and to the particular advantages flowing from the present improvements in connection therewith, those skilled in the art will understand the analogous problems and advantages to be found in other uses and purposes.

Generally speaking, the principal desiderata in machines of this type are speed, sensitiveness and stability, these terms embracing subordinate factors contributory to their attainment and which need not be more specifically enumerated. Further, it is generally recognized that these three desirable conditions and their contributory factors are, to a considerable degree incompatible, with the result that devices heretofore known have provided for a compromise, the maximum in one or another of the desirable conditions being sacrificed for the purpose of attaining some other condition to a reasonable extent.

It is the principal object of the present invention to provide a fluid operated regulating machine which shall provide to a greater degree than heretofore, speed, sensitiveness and stability. It is a further object of the invention to provide a regulating machine which shall have these desirable characteristics and yet which shall be simple in construction, compact, of comparatively few parts, convenient to assemble initially, inexpensive to manufacture and maintain, and formed with most of the moving parts enclosed and well lubricated.

More specifically, in accordance with the preferred embodiment of the improvements, it is proposed to associate together in intimate physical and functional relationship the elements comprising, (a) the regulating mechanism, (b) the stabilizing mechanism, (c) the pilot valve and, (d) the return motion mechanism. The improvements further lend themselves peculiarly to the close or remote association with these elements of the relay piston and also to the association therewith of a suitable capacity and inertia element where the conditions make that advisable.

A further important object of the invention is to provide a regulating machine which, having the characteristics noted above, shall be so constructed as to reduce to a minimum the frictional and inertia factors to the end that all of the operating parts may be of comparatively small size and mass thereby contributing appreciably to speed, sensitiveness, stability, compactness and cheapness. One of the most important contributing causes to these results is found in the improved stabilizing mechanism which is believed to be radically new in principle in that the stabilizing force is derived from a pressure fluid discharged through a jet or jets at predetermined velocity to impinge on an element to which the multiplying valve is responsive. The stabilizing jet or jets are under the control of a valve or valves responsive to movements of the regulating element and their effective force may be regulated selectively and also indicated, by means which comprise a part of the improvements. By such stabilizing means it is evident that physical connections between the stabilizing element and the multiplying valve are eliminated as are associated friction elements calculated to exert a retarding force on the regulator action. The elimination of such connections and devices, as indicated above, permits the use of relatively small parts throughout while at the same time increasing the speed and sensitiveness through more effective stabilization. Such stabilizing means are, unlike those heretofore employed, wholly free from the influence of viscosity changes due to temperature variation. Further, the improved jet stabilizer produces at all times a reactionary force proportional to the departure from normal of the control pressure.

The term "jet" or "fluid jet" as used throughout the specification is used in its technical sense as accepted in the mechanical arts and implies definitely a liquid stream shot from a small orifice, the force of which is availed of to effect stabilization. The effective force of a jet, as is known, is greater than the mere pressure of a stream or any static pressure established within an enclosed chamber by a stream of given pressure, and is referable to the velocity of the jet as well as the angularity with respect to the axis of the jet of the reacting surface against which the jet impinges.

A further object of the invention is to mount the regulating element (disclosed herein as a piston) concentrically with the pilot valve and also with the control valve for the stabilizing jets so that these moving parts may be completely housed and compactly mounted within the main case and adequately protected after initial assembly, while receiving good lubrication in service. By mounting these parts concentrically and in such relationship as to be movable relatively on a single axis it becomes possible to provide for them a cylinder liner or liners in which they are inserted, such liner or liners in turn being carried within a coaxial cylindrical bore in the main casing. The construction referred to further permits the regulator piston to be mounted in the case in proximity to the multiplying valve, the balance lever and the stabilizing jets, the entire relationship further eliminating physical parts and friction and conducing to compactness, accessibility and maintenance.

A further object of the invention, consistent with those heretofore noted, is to provide return motion mechanism of simple and efficient form in proximity to the pilot valve and to so interconnect the regulator piston and the pilot valve with the return motion mechanism as to insure efficient transmission of motion from the regulator piston to the pilot valve and efficient restoration of the pilot valve to neutral by the return motion mechanism under the influence of the relay piston. The improved mechanism is simple in form and the entire assembly is such as to permit the mounting of the return motion mechanism compactly within the base of the main case.

While the improved construction readily permits the relay piston to be mounted in proximity to the main case or at any point remote therefrom it is contemplated that the pilot valve shall be mounted within the main case and control the admission of the actuating pressure fluid to one side or the other of the relay piston in response to the action of the regulator. By this construction it is sufficient to lead the pressure fluid into the main case through a single line and then by the provision of appropriate ducts and ports within the main case to lead the pressure fluid to the regulator piston, to the pilot valve by which its continued flow is controlled, and also to the stabilizing jets. This arrangement contributes further to compactness, protection and easy regulation and control since such ducts and ports may be so designed or controlled as to give any desired predetermined pressures and conditions.

A further object of the invention is to provide control valves for the stabilizing jets which shall be responsive to movement of the regulator piston whereby the stabilizing force is responsive to the action of the multiplying valve. More specifically, in accordance with the present invention the control valves for the stabilizing jets are carried with the pilot valve and move therewith, these controlling valves for the jets being mounted coaxially with the regulator piston and with the pilot valve.

Still another object of the invention is to connect the relay piston operatively with the return motion mechanism by means which are simple in construction and wholly responsive to movements of the relay piston thereby insuring sensitive interaction as between the pilot valve and the relay piston.

As a further feature of the present improvements it is contemplated that there may be associated operatively with the balance lever and with the regulator piston a capacity and inertia element where that may become necessary to compensate for capacity effects in certain installations. Applied to the present disclosure, for instance, such a device has for its purpose to compensate for large capacity effects in pressure. In principle, the improved element provides for a false loading of the balance lever thereby causing the regulator momentarily to control for a lower pressure than it otherwise would, the false loading being slowly removed until all of the parts are again in a normal balanced condition. To accomplish this condition sylphons are operatively interposed between the regulator piston and the balance lever and a false loading spring is included in this connection so that it is influenced by the action of the sylphons whenever there is a departure from normal. The sylphon action determines the rate at which the false loading effect established by the spring is cancelled, this rate being slower than the natural hunting period of the system being regulated.

Further objects and advantages of the invention not particularly mentioned hereinbefore will appear in connection with the detailed description of the embodiment of the improved principles illustrated in the accompanying drawings, wherein.

Before describing the improved structure it is believed that an understanding of the general functional relationship of parts and method of operation will be helpful. Such general understanding can be had from the diagrammatic view constituting Figure 9 although this view is not intended to be a disclosure of the patentable improvements except insofar as broader claims may read thereon. In this figure a fluid conduit is illustrated at $a$, a control valve therein at $a'$ and a power actuating member for the valve in the form of a piston $b$, reciprocable in a cylinder $c$, actuating fluid being admissible to the cylinder at one side or the other of the piston $b$ to move the control valve $a'$ in accordance with the condition required within the conduit. Movement of the relay piston $b$ is responsive to power impulses initiated trol valve $a'$ in accordance with the conditions responsive to departures from the normal conditions to be maintained within the conduit. A diaphragm $d$ is disposed within a case $d'$ which communicates with the conduit $a$ through a pipe $a^2$. Thus the diaphragm is constantly subjected to the controlled pressure. A balance lever $e$ having its fulcrum at $e'$ is operatively connected with the diaphragm $d$ as through a stem $d^2$, a weight $e^2$ being carried on the balance lever at the opposite side of the fulcrum so that the lever will move in accordance with the movements of the diaphragm. A regulator cylinder is illustrated at $f$ and within this cylinder is mounted a regulator piston which is compound comprising a larger section $f'$ and a smaller section $f^2$, each section moving within a cylindrical part of corresponding size. A conduit $g$ is illustrated diagrammatically as the source of supply of an actuating pressure fluid. This fluid is admitted to the cylinder $f$ through a port $f^3$ at a point between the larger and smaller piston sections so that both of them are subjected to the pressure of the entering fluid in proportion to their respective areas. From this space between the piston sections may extend a by-pass in the cylinder wall illustrated at $f^4$, this by-pass being controlled by an adjustable needle valve $f^5$ and communicating with the cylinder on the opposite side of the larger piston section $f'$. By means of the needle valve $f^5$ the pressure thus imposed on the opposite side of the larger piston section may be reduced to any desired point. This pressure may escape to atmosphere from the cylinder through an orifice $f^6$ which is controlled by the balance lever $e$. Upon a departure from normal in the control pressure the diaphragm $d$ will move the balance lever $e$ so as to open the orifice $f^6$ or close it, as the case may be, to an extent sufficient to create a pressure differential on the piston sections $f'$, $f^2$ and thereby bring about movement of the piston in one direction or the other. Movement of this piston in turn brings about movement of the control devices for the element which actuates the valve $a'$. A cylinder is indicated at $h$ within which reciprocates a pilot valve, the effective parts of which are indicated at $h'$, $h^2$. Between these two parts of the pilot valve is a space into which the actuating pressure fluid is introduced from the source $g$, a single pipe $g'$ constituting the connection. This actuating fluid pressure may escape from the space between the sections $h'$, $h^2$, of the pilot valve through either a port $h^3$ or a port $h^4$ in the wall of the cylinder $h$ under the control of the pilot valve sections $h'$, $h^2$, respectively. From the ports $h^3$, $h^4$, may extend line connections $h^5$, $h^6$ respectively, communicating with the cylinder $c$ at opposite sides of the relay piston $b$. The pilot valve has a stem $h^7$ which is connected through a lever $h^8$, supported pivotally at $h^9$, with the stem $f^7$ of the regulating piston. Thus, movement of the regulating piston in one direction or the other will be impressed on the pilot valve moving the sections $h'$, $h^2$, in one direction or the other to permit the passage of the actuating pressure fluid through one of the ports $h^3$, $h^4$, into the relay cylinder to move the piston $b$. When the pilot valve $h^2$ moves upwardly as viewed in Figure 9 to admit the actuating pressure fluid to the port $h^4$ the lower section $h'$ opens the port $h^3$ so that fluid from the pipe $h^5$ may escape through an opening $h^{10}$ in the wall of the cylinder $h$. Contrariwise, when the pilot valve $h'$ moves downwardly to admit pressure fluid to the port $h^3$ the upward section $h^2$ uncovers the port $h^4$ so that fluid may escape from the pipe $h^6$ through an opening $h^{11}$ in the cylinder. This description makes it clear that the relay piston $b$ has its movements initiated by the regulator piston $f'$, $f^2$, the movements of which in turn are responsive to the controlled pressure acting on the diaphragm $d$.

The necessity for stabilizing the action of a regulator is well understood. Broadly speaking, the present invention involves the use of a new principle in stabilizers. Referring again to Figure 9 it will be seen that the source of actuating pressure fluid may be led to the cylinder in which the pilot valve is located through another pipe $g^2$. This pressure may be regulated by a needle valve $g^3$. Within the cylinder $h$ and attached to the pilot valve sections $h'$, $h^2$, if desired, are control valves $k$, $k'$, for the stabilizing fluid pressure. These valves control ports $k^2$, $k^3$, communicating with the pipes $k^4$, $k^5$, which discharge through nozzles $k^6$ and $k^7$, respectively. These nozzles, under the control of the valves $k$, $k'$, discharge jets of the pressure fluid against the balance lever $e$, cups $e^3$ being provided thereon in cooperative relation to the impinging jets. The velocity of the jets taken with the deflection thereof upon impact will determine the effective stabilizing force.

Figure 9:
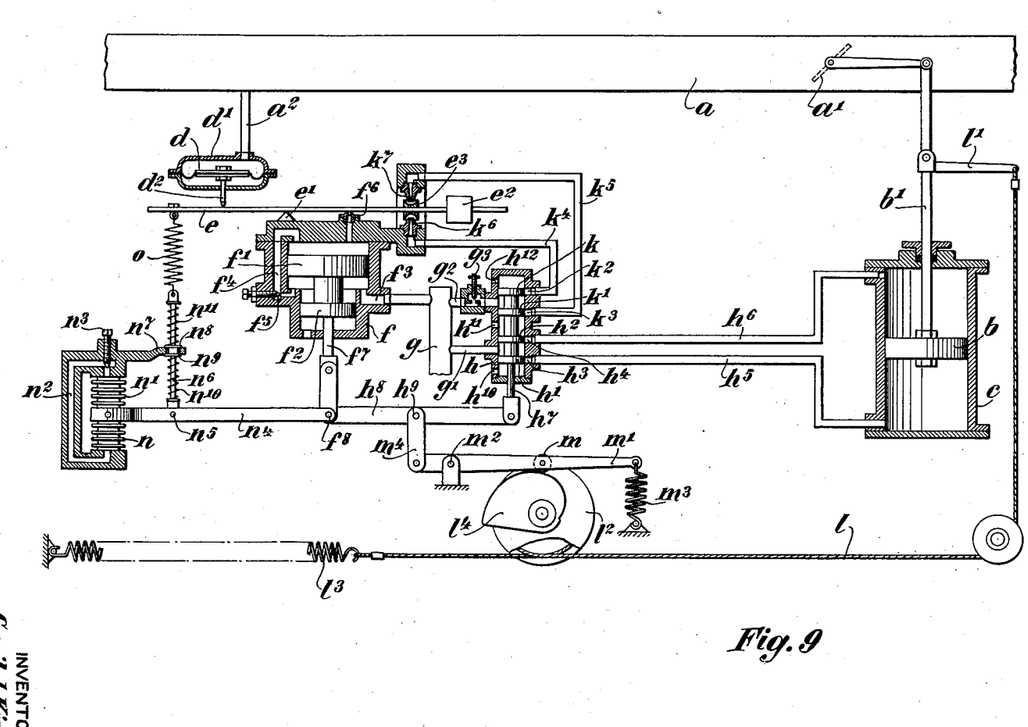
Figure 9 is a schematic view illustrating the general relationship of parts corresponding in function to the elements disclosed in the other figures of the drawings whereby a better understanding of the method of operation may be obtained.

When the regulator piston $f'$, $f^2$, moves, the control valves $k$, $k'$ will be moved to admit the pressure fluid to the appropriate pipe $k^4$ or $k^5$ to stabilize action of the balance beam by the release of an impinging jet. It is evident that the pipe $k^5$ may communicate with the atmosphere through the port $h^{11}$ in the cylinder $h$ when the valve $k'$ moves upward and the pipe $k^4$ may communicate with the atmosphere through a port $h^{12}$ when the control valve $k$ moves downward. This method of stabilizing eliminates all physical connections between the stabilizing mechanism and the balance beam and does away with friction elements in association with the regulating piston.

Upon movement of the relay piston $b$ under the control of the pilot valve sections $h'$, $h^2$, as described, means are actuated to restore the pilot valve sections to neutral position where the ports $h^3$, $h^4$, are closed. In principle, the return motion mechanism is connected through a cable $l$ to an arm $l'$ carried on the stem $b'$ of the piston $b$. This cable is shown in the schematic embodiment as passing around a drum $l^2$ and anchored yieldingly by a contractile spring $l^3$ so that the drum $l^2$ will be oscillated in one direction or the other upon movement of the piston $b$. The drum $l^2$ is shown as carrying a cam $l^4$. Cooperating with this cam is a roller $m$ carried on a lever $m'$ pivoted at $m^2$. A spring $m^3$ maintains the roller $m$ in contact with the cam. The remote end of the lever $m'$ carries a link $m^4$ on the upper end of which is supported a lever $h^8$ by means of a pin $h^9$. The relationship of parts is such that movement of the regulating piston $f'$, $f^2$ serves to rock the lever $h^8$ about the pin $h^9$. Responsive movement of the piston $b$ causes immediate rotation of the cam $l^4$ thereby rocking the lever $m'$ about its pivotal support $m^2$ and restoring the pilot valve to its neutral position, the lever $h^8$ during this return motion rocking about the pivotal connection $f^8$ between its end and the lower end of the regulating piston stem $f^7$. In the illustrated embodiment it is evident that the control valves $k$, $k'$, for the stabilizing jets will simultaneously be restored to neutral position to remove the stabilizing force.

Interposed operatively between the stem $f^7$ of the regulating piston and the unweighted end of the balance lever $e$ is a capacity or inertia mechanism. Generally speaking, this includes two sylphons $n$, $n'$, the interiors of which communicate through a passage $n^2$ restricted to any desired degree by an adjustable needle valve $n^3$. The movable wall of the sylphons is pivotally connected to a lever $n^4$, the end of which is attached to the regulating piston stem $f^7$ by the pin $f^8$. Intermediate the ends of this lever $n^4$ there is pivotally attached at $n^5$ a plunger $n^6$ which passes freely through a fixed bracket $n^7$. The bracket $n^7$ may carry spring seats $n^8$, $n^9$. Springs $n^{10}$, $n^{11}$ are interposed operatively between the spring seat $n^9$ and the lower end of the plunger and between the spring seat $n^8$ and the upper end of the plunger, respectively. These springs may be termed break-away springs. Between the upper end of the plunger $n^6$ and the unweighted end of the balance lever $e$ is interposed a coiled spring $o$ which may be termed a loading spring for the lever. In systems subject to large capacity or inertia factors the mechanism just described may be employed. It is evident that when the regulating piston moves, the floating head of the sylphons will be displaced and one of the break-away springs $n^{10}$ and $n^{11}$ compressed, the plunger $n^6$ at the same time being moved axially to increase or decrease the tension on the loading spring $o$. The result obtained is to maintain the loading action of the spring $o$ on the regulating system during the period required for the compressed break-away spring to resume its normal condition under the retarding action of the sylphons. This period is sufficiently protracted to insure the restoral of normal balanced conditions throughout the system despite the lag imposed by the inertia or capacity to which the particular system is subjected.

Figure 1:
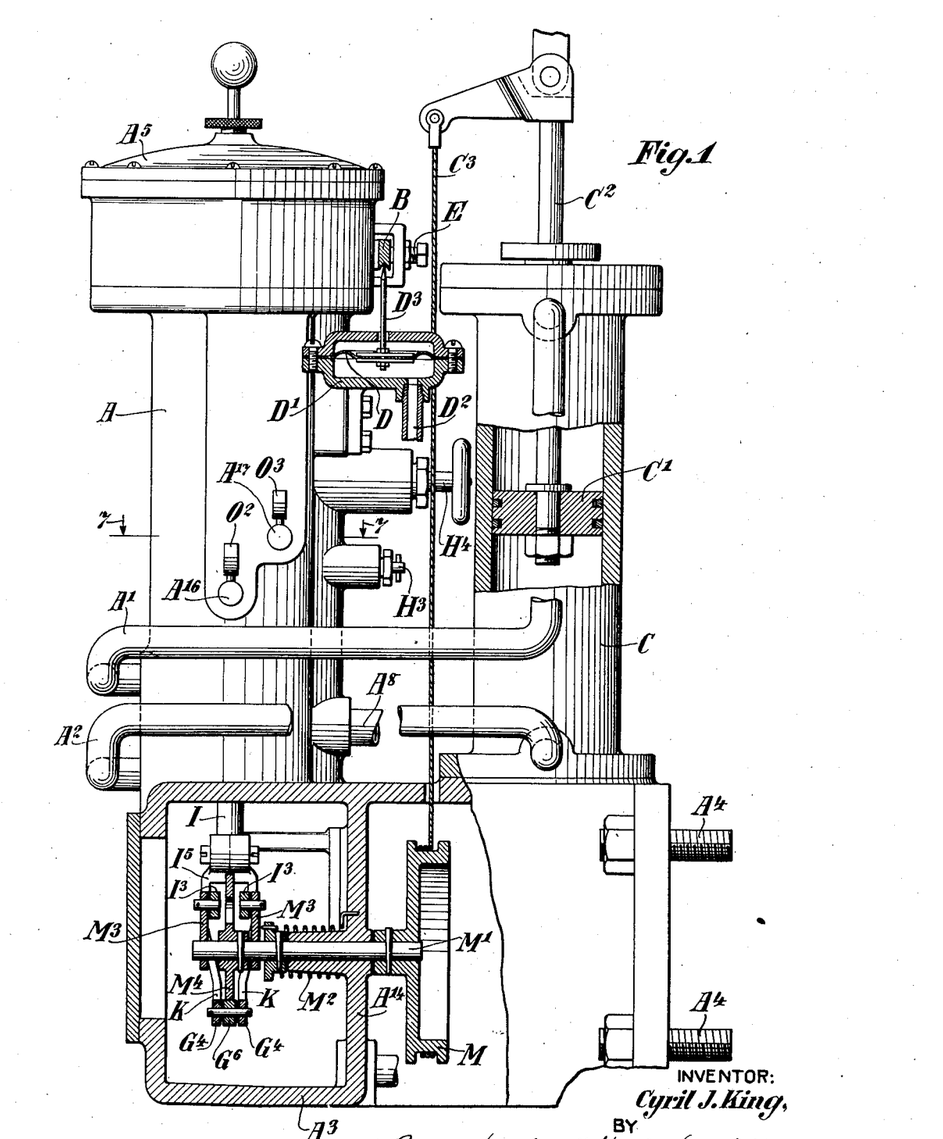
Figure 1 is a view in elevation of the improved machine, parts being broken away in the interest of clearness.
Figure 2:
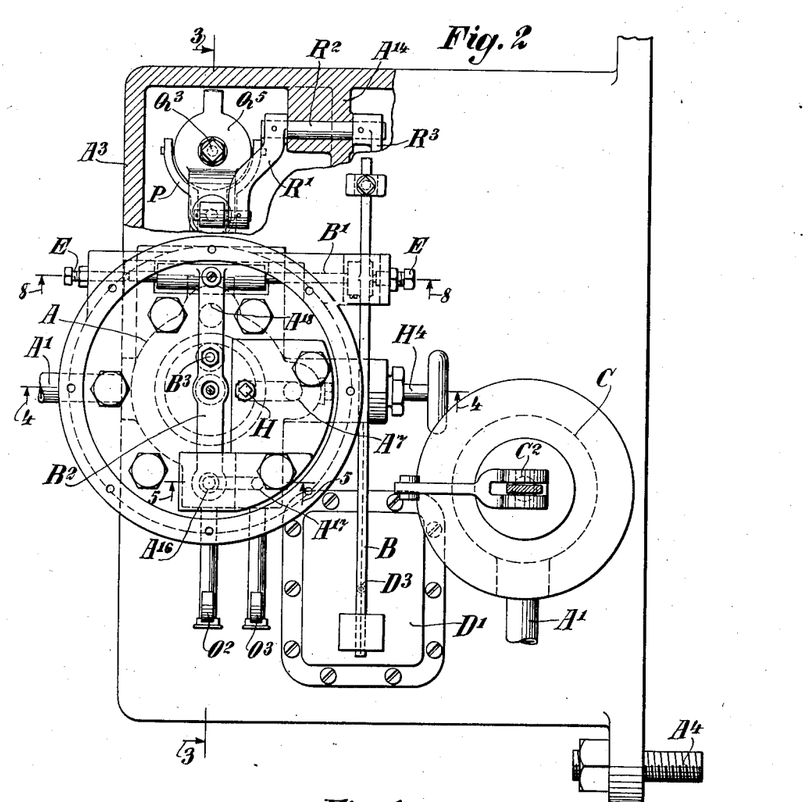
Figure 2 is a view in plan of the machine illustrated in Figure 1, parts being broken away.

Reference is now directed to the remaining figures of the drawings for a detailed description of the preferred embodiment of the improvements. In Figures 1 and 2 there is shown a compact and effective arrangement of parts in which all of the elements corresponding to those heretofore described are brought together in a unitary mounting. That is to say, the relay piston is disposed in close proximity to the other elements and mounted on the same base therewith. As pointed out hereinbefore the relay piston may be mounted at a remote point. The main case is indicated at A. It is connected by pipes A', $A^2$, to opposite ends of the cylinder C for the relay piston C'. The stem $C^2$ of this piston is connected to the controlled element (such as a valve) and also to a cable $C^3$ by which the return motion mechanism is actuated. Adjacent the head of the main case A is supported pivotally the balance lever B and the control diaphragm D within a casing D' which has a pipe $D^2$ in communication with the controlled pressure line. A stem $D^3$ on the diaphragm D transmits motion of the diaphragm to the balance lever B. The casing A and cylinder C are supported on an enclosed base $A^3$ in which may be housed the return motion mechanism including the interconnections between the regulating piston, the pilot valve, the control valves for the stabilizing means and the actuating cam for the return motion mechanism. The case $A^3$ may be provided with lugs and bolts such as $A^4$ as a convenient means for mounting the entire unitary structure. Figure 2 shows the cap $A^5$ removed and also shows the anti-friction cone screws E for supporting the rock shaft B' which carries the balance lever B. This rock shaft has secured thereto or formed integral therewith a carrier arm $B^2$ which may extend substantially parallel to the balance lever B and will, of course, move simultaneously therewith about the anti-friction bearings E. The carrier lever $B^2$ has mounted thereon a multiplying valve $B^3$ by which movement of the regulator piston is controlled and may also have formed at its end cups $B^3$, $B^4$, against which the stabilizing jets impinge as will appear more fully hereinafter. A device to dampen high frequency oscillations of the valve carrier $B^2$ may be associated therewith independent of the stabilizing mechanism as the term is usually understood in the art. Such a dampener may take many forms. That illustrated comprises a depending vane $B^5$ formed with the carrier $B^2$ and immersed in a suitable liquid such as oil in a chamber $B^6$ formed to receive the vane. A displaced diaphragm immersed in oil will serve the same purpose.

Figure 3:
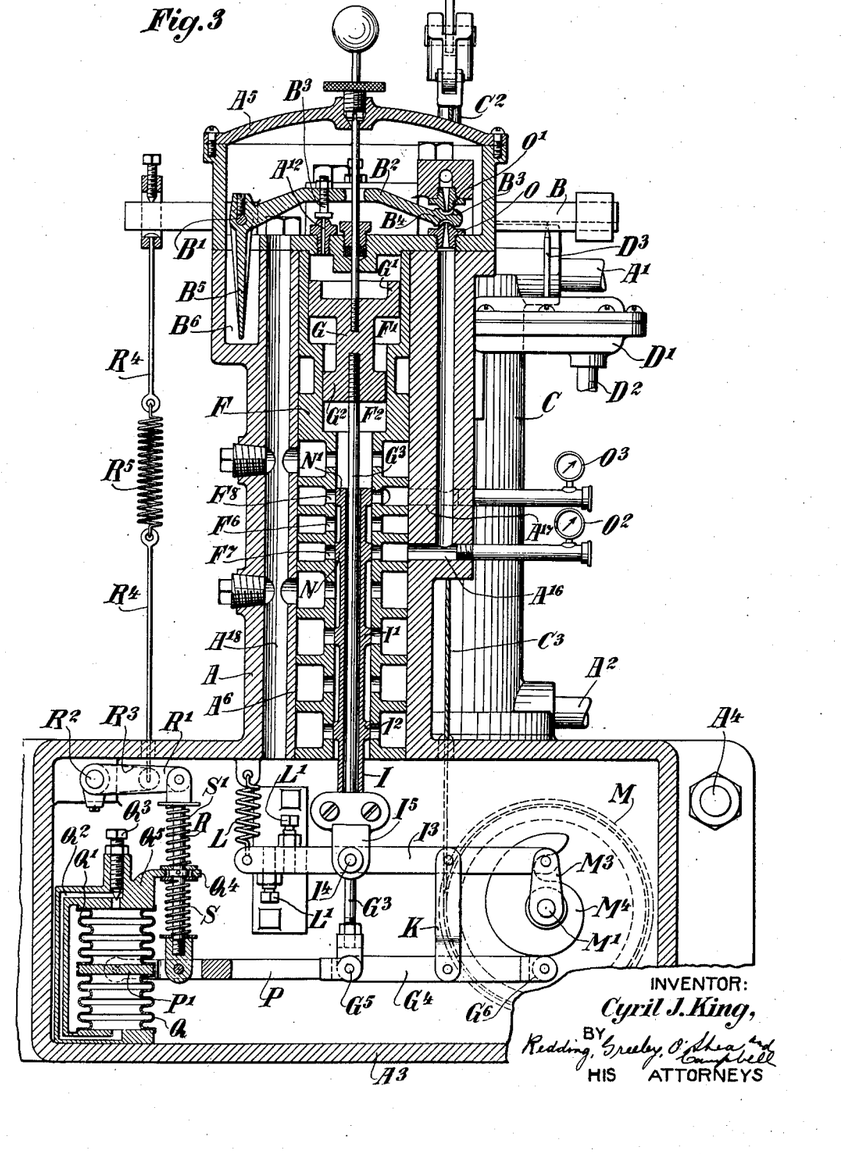
Figure 3 is a view in vertical section taken through the case shown in Figure 2 and along the line 3—3 thereof and looking in the direction of the arrows.
Figures 4, 5, 6, 7:
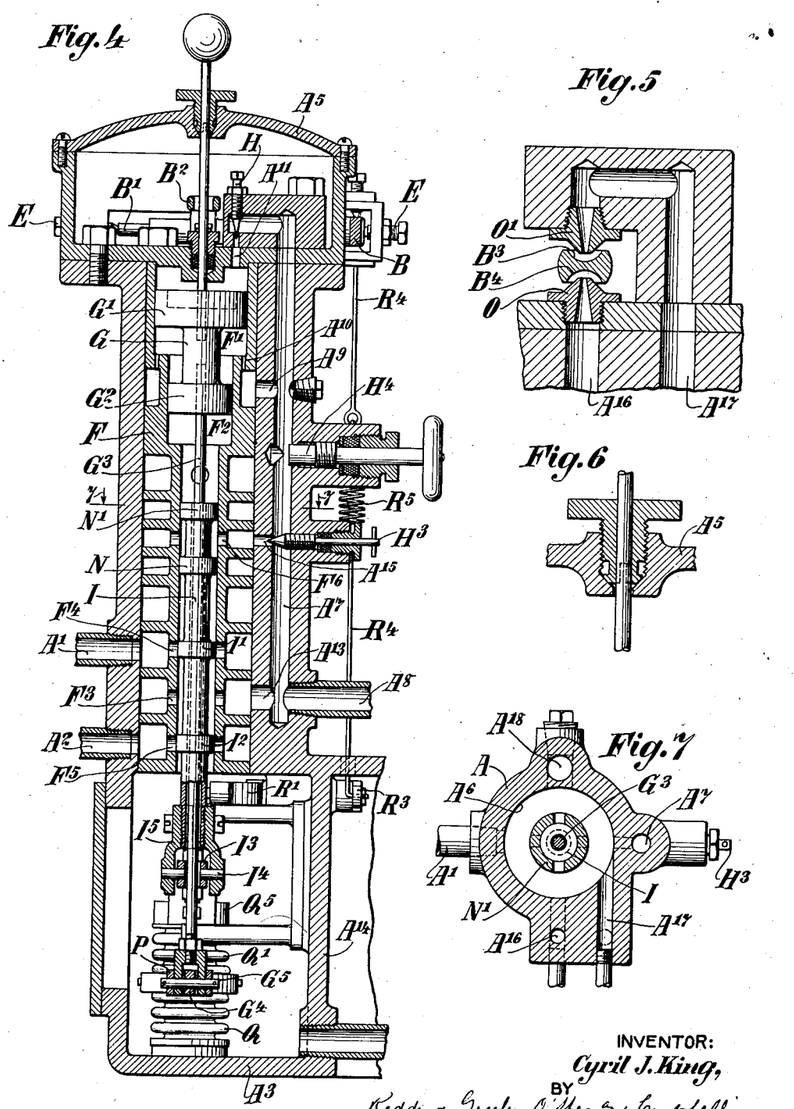
Figure 4 is a view in vertical section taken at right angles to the plane of the section of Figure 3, through the main case shown in Figure 2 and on the plane indicated by the line 4—4 looking in the direction of the arrows.
Figure 5 is a fragmentary detailed view in section and on a somewhat larger scale showing the stabilization jets in relation to the carrier for the multiplying valve, the section being taken at right angles to the section of the corresponding parts illustrated in Figure 3 and on the plane indicated by the line 5—5 of Figure 2 looking in the direction of the arrows.
Figure 6 is a fragmentary detailed view in section showing the upwardly extending stem of the regulator piston and its connection to manual operating means.
Figure 7 is a detailed view in horizontal section through the case shown in Figure 4 and taken on the plane indicated by the line 7—7 thereof.
Figure 8:
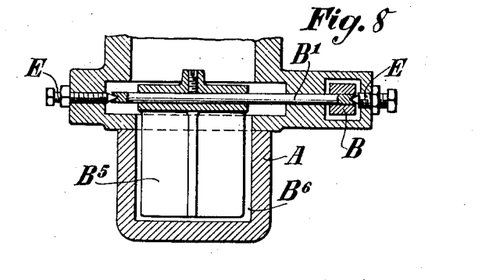
Figure 8 is fragmentary detailed view in section showing the damper for the carrier of the multiplying valve and the anti-friction cone bearings by which the balance lever and carrier are supported.

Reference is now made particularly to Figures 3–8. Figures 3 and 4 show strikingly the compactness of the assembly, the fewness of parts and the protection afforded to them. The casing A is provided interiorly with a cylindrical bore $A^6$. Within that cylindrical bore is fitted a cylinder liner or liners. In the embodiment shown a single liner F is illustrated. At its upper end this liner has two chambers F', $F^2$ of different diameters to receive the two sections of the regulating piston indicated generally at G. The upper section G' of this piston is of relatively large diameter and moves within the cylindrical portion F' while the lower section $G^2$ is of smaller diameter and moves within the smaller cylinder $F^2$. In one wall of the casing A is formed a passage $A^7$ with which communicates a pipe $A^8$ through which an actuating pressure fluid is introduced. From the duct $A^7$ this fluid is led through ports $A^8$, $A^9$, to the cylinder spaces F', $F^2$ between the piston sections G', $G^2$. The duct $A^7$ also communicates with the cylinder space above the piston section G' through a port $A^{11}$ which is controllable by an adjustable needle valve H. A hand operated valve $H^4$ may be so disposed in the duct $A^7$ as to enable pressure fluid admitted to the cylinder spaces to be regulated where, as is entirely practicable, the forces on the regulator piston are relatively high but, as will appear later, the stabilizing forces may be commensurate. The areas of the piston sections G', $G^2$ and the pressure to which they are subjected are such that under predetermined conditions a state of balance is maintained and the regulator piston will not move. However, the cylinder space above the large piston section G' communicates with the atmosphere through an opening $A^{12}$ which is under the constant control of the multiplying valve $B^3$. When the rate of escape of the pressure fluid through the opening $A^{12}$ is greater or less than the predetermined rate a differential pressure will be established on the piston sections and the piston will move in one direction or the other to initiate compensation for the departure from normal of the controlled pressure, as will later appear. The pressure fluid escaping through the nozzle $A^{12}$ under the control of the multiplying valve $B^3$ may be led to the base of the apparatus at atmospheric pressure through a return duct $A^{18}$ formed in the wall of the case A. Where, as is usual, the pressure fluid is oil its lubricating qualities are availed of for the moving parts throughout its circuit.

Within the cylinder liner F there is disposed a pilot valve which is illustrated as a tubular member I having enlarged valve sections $I'$, $I^2$, thereon. The pilot valve is mounted concentrically with the regulator piston G and with the cylinder $A^6$. The pipe $A^8$ for the pressure fluid communicates with the space between the sections $I'$, $I^2$ of the pilot valve through a port $A^{13}$ in the cylinder wall and ports $F^3$ in the liner. The valve section $I'$ controls the ports $F^4$ by which a communication may be established with the pipe $A'$ while the valve section $I^2$ controls the ports $F^5$ by which communication may be established with the pipe $A^2$. Since movement of the pilot valve is brought about under the influence of the regulator piston G the connections between these two elements will be described. The regulator piston G carries a stem $G^3$ which extends downwardly through the tubular pilot valve I into the base $A^3$ of the machine. This stem is connected at its lower end pivotally to a lever $G^4$, the pivotal connection being indicated at $G^5$. The lever $G^4$ is connected by a link K to a lever $I^3$ which is pivotally connected by pins $I^4$ to a clevis $I^5$ carried at the lower end of the tubular pilot valve I. The associated parts of this lever system will be described later in connection with the return motion mechanism. Suffice it to say that when the regulator valve moves, its motion is impressed on the pilot valve by the interconnections described. When the pilot valve moves and admits the pressure fluid to one side or the other of the relay piston $C'$, this piston will bring about the desired regulating movement of the controlled element.

Upon movement of the piston, however, provision must be made for restoral of the pilot valve to its normal position. Simple and efficient mechanism and interconnections to accomplish this end have been illustrated. The cable $C^3$ which is connected to the stem $C^2$ of the relay piston $C'$ extends into the base compartment $A^3$ and around a drum M mounted on a shaft $M'$ which may be journaled for rotation in a web $A^{14}$ within the base $A^3$. A torsional spring $M^2$ is operatively engaged with the shaft $M'$ so as to resist rotation of the drum M under the pull of the cable $C^3$ and to rotate the drum in a contrary direction when the cable $C^3$ permits. The sections of a double lever $M^3$ supported on the shaft $M'$ serve to support pivotally the actuating lever $I^3$ for the pilot valve. Between these links $M^3$ is mounted a cam $M^4$ which rotates with the shaft $M'$. The end of the lever $G^4$ which is pivotally connected to the stem $G^3$ of the regulator piston carries a roller $G^6$ which bears on the face of the cam $M^4$.

In operation, when the regulator piston moves upward it moves the pilot valve upwards so that the section $I'$ admits the pressure fluid to the cylinder C above the relay piston $C'$ whereupon the piston moves downwardly. Under the influence of the torsional spring $M^2$ the cam $M^4$ is rotated counterclockwise. Under the influence of the cam the lever $G^4$ has its free end moved downwardly about the center $G^5$ and thus the lever $I^3$ is moved downwardly to restore the pilot valve to its normal position. Contrary movement of the pilot valve will reverse the direction of travel of the relay piston $C'$ and the direction of rotation of the cam $M^4$ to the end that the cam will, through the return motion linkage described, restore the pilot valve to neutral position. It will be noted that the free end of the lever $I^3$ is engaged by a spring L which balances out the load and inertia impressed on the lever $I^3$, stops $L'$ being provided to prevent overtravel of the lever.

So far as the device has been described it will be apparent that the parts are small, compact, few in number and in close proximity with the result that maximum speed and sensitiveness in responsiveness are obtained. However, where such speed and sensitiveness are provided for, the critical factor is stability. One of the most important improvements resides in the method of effecting maximum stability despite the improved conditions of speed and sensitiveness. In the preferred construction the tubular pilot valve is extended coaxially of the main cylinder $A^6$ and carries valve members N, $N'$. To the space between these valve members is admitted the pressure fluid from the duct $A^7$ through a port $A^{15}$ in the cylinder wall and a port $F^6$ in the liner wall. The port $A^{15}$ may be controlled through an adjustable needle valve $H^3$. The valves N, $N'$, control the flow of the pressure fluid to the stabilizing mechanism. The valve N controls ports $F^7$ from which the pressure fluid may flow through the duct $A^{16}$ to the nozzle O which discharges a jet against the cup $B^4$ on the under side of the carrier $B^2$ for the multiplying valve $B^3$. The valve $N'$ controls the flow of pressure fluid through ports $F^8$ through a duct $A^{17}$ to a nozzle $O'$ which discharges against the cup $B^3$ on the upper side of the valve carrier $B^2$. Thus it is that the valve carrier $B^2$ and the balance lever B are subjected to the force of the jet from one or the other of the nozzles O, $O'$, under the control of the valves N, $N'$, respectively. As has been pointed out, the pressure of the fluid admitted past the valves N, $N'$, may be controlled by the needle valve $H^3$. The effective value of each jet on the lever $B^2$ will depend on several controllable factors such as the velocity of the fluid emitted from the nozzles, the character of the cups on which the jets impinge, and the number and location of the nozzles. If the force opposing movement of the balance lever in one direction is to be higher than the force opposing its movement in the opposite direction (as might be desirable where the characteristics of the controlled system require) such differential may readily be obtained to any desired predetermined extent by controlling any one or more of the factors noted. A gauge $O^2$ may be connected with the duct $A^{16}$ to indicate visually the pressure of the fluid passing to the nozzle O while another gauge $O^3$ may be connected to the duct $A^{17}$ to show the pressure of the fluid passing to the upper nozzle $O'$.

It will be evident that the improved method of stabilization eliminates mechanical connections between the stabilizing force and the member to be stabilized thereby insuring a greater sensitiveness and eliminating friction and inertia. Retarding members such as dash pots, as heretofore employed, are eliminated with their attendant friction, sluggishness and lack of uniformity in action arising from variations in viscosity of the retarding fluid, oil, under temperature changes. The stabilizing jets may be of relatively high value and their force is applied instantly upon movement of the regulator piston and is removed instantly upon cessation of movement of the regulator piston. The result is wholly that to be desired permitting the utmost speed and sensitiveness without loss of stability. Further, as indicated hereinbefore, the stabilizing jets are controllable in their relative values to meet conditions where such a differential is desirable.

The structural advantages of the assembly from the standpoint of the manufacturer and user will be apparent from Figures 3 and 4. The main casing is bored centrally at $A^6$ to receive the liner or liners for the moving parts that are mounted coaxially therein. This construction is extremely inexpensive to manufacture and assemble and it permits the parts to be assembled at the plant so that the unit may be sent out for installation with all of the parts in place and completely protected against damage or derangement. It is further evident that the parts are readily accessible for inspection or repair.

The inertia and capacity element heretofore referred to in connection with the description of Figure 9 may or may not be included in the assembly but the improved structure has been so designed as to lend itself to the inclusion of such an element without the sacrifice of the general advantages heretofore attributed to the improved apparatus. Referring now particularly to Figure 3 it will be evident that the pin $G^5$ at the bottom of the stem $G^3$ of the regulator piston is connected through a lever P to a movable plate P′ interposed between opposed sylphons Q, Q′, the interiors of which communicate through a by-pass $Q^2$ controlled by a needle valve $Q^3$. The lever P is pivotally connected intermediate its ends to a plunger R which passes through an opening in a bracket $Q^4$ carried for convenience on the case $Q^5$ of the sylphons. Interposed operatively between the bracket $Q^4$ and the opposite ends of the plunger R are break-away springs S, S′. The upper end of the plunger R is connected pivotally to a crank arm R′ which is carried on a rock shaft $R^2$ at the other end of which is a second arm $R_3$. (Figure 2.) The end of the arm $R^3$ is connected to the balance lever B by links $R^4$ between which is interposed a loading spring $R^5$. The parts described, with the exception of the linkage $R^4$ and the spring $R^5$, may be wholly housed within the base of the device and mounted in close proximity to the regulator stem $G^3$. Upon movement of the regulator in one direction or the other the lever P will be rocked thereby compressing one of the springs S, S′, depending upon the direction of the movement of the regulator. As a consequence of this action the plate P′ between the sylphons will be displaced. Movement of the plunger R during this action will rock the lever R′ thereby changing the loading effect of the spring $R^5$ on the balance lever B. Under these conditions it is evident that a balance of the regulating parts cannot be restored until the loading spring $R^5$ is restored to normal and this will not be accomplished, in turn, until the interposed plate P′ resumes its normal position and the break-away springs S, S′, are in their normal position and condition. The rate of restoral of the normal condition of the spring $R^5$ will be determined by the action of the sylphons which, as is known, is determined by the regulating needle valve $Q^3$ controlling the by-pass $Q^2$. This false loading compensates for the time lag in the regulated line incident to capacity, thereby eliminating undue oscillations in the regulator and hunting.

It has been sought to emphasize throughout this specification the novel principles employed and the fact that those skilled in the art will find it evident as to how these principles may be employed advantageously in systems other than that shown and embodied in physical form and relationship other than that selected for the purposes of this description. Modifications of the system, however, for the purpose of adapting any one or more of the principles to other situations and requirements and changes in the form, relative locations and arrangement of parts and the omission of one or more of the elements and the addition or substitution of other elements in the assembly are not to be regarded as departures which are not contemplated or which are outside of the intended scope of the disclosure.

I claim as my invention:

1. In a fluid operated regulating machine, a control element responsive to departures from normal, fluid actuated regulating means, a valve to control the operation of said fluid actuated regulating means, means responsive to the control element on which said valve is mounted and stabilizing means comprising a fluid jet dischargeable upon movement of said fluid actuated regulating means, the force of the jet being impressed on said valve carrying means.

2. In a fluid operated regulating machine, a control element, a balance lever, fluid actuated regulating means, a valve to control the operation of said regulating means, a valve carrier movable responsively to said control element, means associated with the valve carrier to dampen out high frequency oscillations thereof, stabilizing means comprising a fluid jet dischargeable under the control of the said regulating means, and means to impress the force of the jet on the said valve.

3. In a fluid actuated regulating machine, a control element, a valve, a carrier for the valve movable under the influence of the control element, regulating means controlled by said valve, a plurality of nozzles mounted in angular relation to the said carrier and means under the control of the regulating means to discharge a stream of fluid through said nozzles, selectively, and onto said valve carrier.

4. In a fluid actuated regulating machine, a case having an opening therein, a stationary liner mounted within said opening, fluid actuated regulating means mounted within said liner and coaxially with said opening, a stem carried with said regulating means extending through said opening coaxially therewith, and a tubular pilot valve mounted within said liner and through which said stem extends in spaced relationship thereto, said stem and pilot valve being relatively movable.

5. In a fluid actuated regulating machine, a case having an opening therein, a stationary liner mounted within said opening, fluid actuated regulating means mounted within said liner and coaxially with said opening, a stem carried with said regulating means extending through said opening coaxially therewith, a tubular pilot valve mounted within said liner and through which said stem extends in spaced relationship thereto, said stem and pilot valve being relatively movable, and operative interconnections between said stem and said pilot valve whereby movement of the regulating means initiates movement of the pilot valve.

6. In a fluid operated regulating machine, regulating means, a fluid actuated relay piston, fluid stabilizing means, unitary valve mechanism to control the action of the stabilizing fluid and the actuating fluid for said relay piston, and means interconnecting said valve mechanism with the regulating means whereby the control of the stabilizing fluid and the actuating fluid for the relay piston is responsive to action of the regulating means.

7. In a fluid operated regulating machine, a casing having an opening therein, ducts for the actuating fluid within the casing, fluid stabilizing means to which fluid is led through said ducts, a relay piston to which fluid is led through said ducts, regulating means to which fluid is led through said ducts, and unitary valve mechanism mounted within said opening coaxially therewith and with said regulating means to control the flow of fluid through said ducts to the stabilizing means and to said relay piston.

8. In a fluid operated regulating machine, a casing having an opening therein, a regulating piston mounted coaxially within said opening, a stem carried by the piston and extending through said opening, fluid stabilizing means disposed within the casing, a source of pressure fluid communicating with ducts within said casing, a relay piston to which said fluid may pass, a tubular valve member mounted within said opening and through which said stem extends, said valve member having sections to control the flow of fluid to the stabilizing means and to the relay piston and interconnections between said stem and tubular valve member whereby the valve member moves responsively to action of the regulating piston.

9. In a fluid operated regulating machine, a casing having an opening therein, ducts for the actuating fluid within the casing, fluid stabilizing means to which fluid is led through said ducts, a relay piston to which fluid is led through said ducts, regulating means to which fluid is led through said ducts, and unitary valve mechanism mounted within said opening coaxially therewith and with said regulating means to control the flow of fluid through said ducts to the stabilizing means and to said relay piston, and adjustable means to control the pressure of the fluid admitted to the stabilizing means.

10. In a fluid operated regulating machine, a casing having an opening therein, ducts for the actuating fluid within the casing, fluid stabilizing means to which fluid is led through said ducts, a relay piston to which fluid is led through said ducts, regulating means to which fluid is led through said ducts, unitary valve mechanism mounted within said opening coaxially therewith and with said regulating means to control the flow of fluid through said ducts to the stabilizing means and to said relay piston, and means to control the pressure of the actuating fluid admitted to the regulating means.

11. In a fluid operated regulating machine, a balance lever, a control element to which the balance lever is responsive, a rock shaft on which the balance lever is carried, anti-friction cone bearings to support the rock shaft for oscillation, a valve carrier supported on the rock shaft and provided with cups, nozzles disposed in juxtaposition to the cups, respectively, and means to control the discharge of fluid through said nozzles selectively against said cups, respectively.

12. In a fluid operated regulating machine, a balance lever, a control element to which the balance lever is responsive, a rock shaft on which the balance lever is carried, anti-friction cone bearings to support the rock shaft for oscillation, a valve carrier supported on the rock shaft and provided with cups, nozzles disposed in juxtaposition to the cups, respectively, means to control the discharge of fluid through said nozzles selectively against said cups, respectively, and means operatively associated with said rock shaft to dampen the high frequency oscillations.

13. In a fluid operated regulating machine, a casing, regulating means mounted within the casing, fluid stabilizing means, a relay piston, control valves for the stabilizing means and the relay piston mounted within the casing, interconnections between the regulating means and said valve means disposed within the base of the casing, and return motion mechanism for said valve means mounted in the base of the casing.

14. In a fluid operated regulating machine, a regulating piston, a pilot valve mounted coaxially therewith, linkage interconnecting said piston and pilot valve whereby movement of the piston initiates movement of the pilot valve, return motion mechanism operatively associated with said linkage, a relay piston, and operative connections between the relay piston and the said linkage whereby movement of the relay piston under the control of the pilot valve initiates operation of the return motion mechanism to restore the pilot valve to neutral position.

15. In a fluid operated regulating machine, a hollow base, a casing mounted on said base, and having therein a cylinder, a relay piston mounted within the cylinder, a stem carried by the piston and connected to the controlled element, a second casing mounted on said base and having an opening therethrough, a source of fluid pressure connected with the second named casing, conduits leading from the second named casing to opposite sides of the said relay piston, a pilot valve mounted within the second named casing to control the admission of fluid to the cylinder of the relay piston, a regulating piston mounted within the second named casing coaxially with the pilot valve, interconnections between the said regulating piston and pilot valve disposed within the base of the machine, return motion mechanism for the pilot valve disposed within the base of the machine, and a connection between the relay piston and the return motion mechanism whereby movement of the relay piston initiates operation of the return motion mechanism to restore the pilot valve to neutral position.

16. In a fluid operated regulating machine, a regulating piston having a stem, a relay piston, a pilot valve mounted coaxially with the said stem to control the relay piston, a lever to which the end of the stem is pivotally connected, a lever to which the end of the pilot valve is connected, said levers being disposed in substantial parallelism, a link interconnecting said levers whereby movement of the stem imparts movement to the pilot valve, a cam against which the remote end of the first named lever bears, and operative connections between the relay piston and the said cam to transmit return motion to the pilot valve upon movement of the relay piston through the aforesaid levers and link.

17. In a fluid operated regulating machine, a control element, a balance lever responsive thereto, a regulating piston, and stabilizing mechanism to compensate for inertia and capacity interposed operatively between the regulating piston and the balance lever, comprising springs whose force is changed by movement of the regulating piston, opposed sylphons having a head to oppose the restoral of said springs to normal condition, and a loading spring interposed between the balance lever and the first named springs, the action of which on the balance lever persists until the restoral of the sylphon head and said first named springs to normal position.

18. In a fluid operated regulating machine, a control element, a balance lever responsive thereto, a casing, regulating means mounted within the case, stabilizing mechanism to compensate for capacity and inertia, mounted within the casing, operative connections between the regulating means and the said element, and a loading spring interposed operatively between said element and the balance lever.

19. In a fluid actuated regulating machine, a case having an opening therein, fluid actuated regulating means mounted within said opening and coaxially therewith, a relay piston, return motion mechanism operatively connected with the relay piston, a stem carried with said regulating means extending through the opening in the case coaxially therewith, a tubular pivot valve mounted within said opening and through which said stem extends, said stem and pilot valve being relatively movable, and means operatively connecting the remote end of said stem with said pilot valve and with said return motion mechanism.

20. In a fluid operated regulating machine, a control element responsive to departures from normal to initiate operation of said regulating machine, a fluid jet whose discharge is initiated by said control element, a member on which the force of said jet is impressed to oppose relative movement between said jet and said member, and means operatively interposed between the movable element and said regulating machine to stabilize the movements thereof.

21. In a fluid operated regulating machine, in combination with a control element, a balance lever responsive to the control element, a fluid actuated regulating means, a valve movable with the balance lever to control the operation of said fluid actuated regulating means, and a fluid jet whose discharge is initiated by said control element and whose force is impressed on the balance lever to oppose movement of the lever and said valve to stabilize the movements of the said fluid actuated regulating machine.

22. In a fluid operated regulating machine, a control element, a fluid actuated regulating means, a fluid jet released and cut off in response to movements of the regulating means, a member on which the force of said jet is impressed to oppose relative movement between said jet and said member, and means operatively interposed between the movable element and said regulating machine to stabilize the movements thereof.

CYRIL J. KING.